Nov. 13, 1934.  W. T. CHRISTMAN  1,980,383
COOKING UTENSIL
Filed Nov. 14, 1933
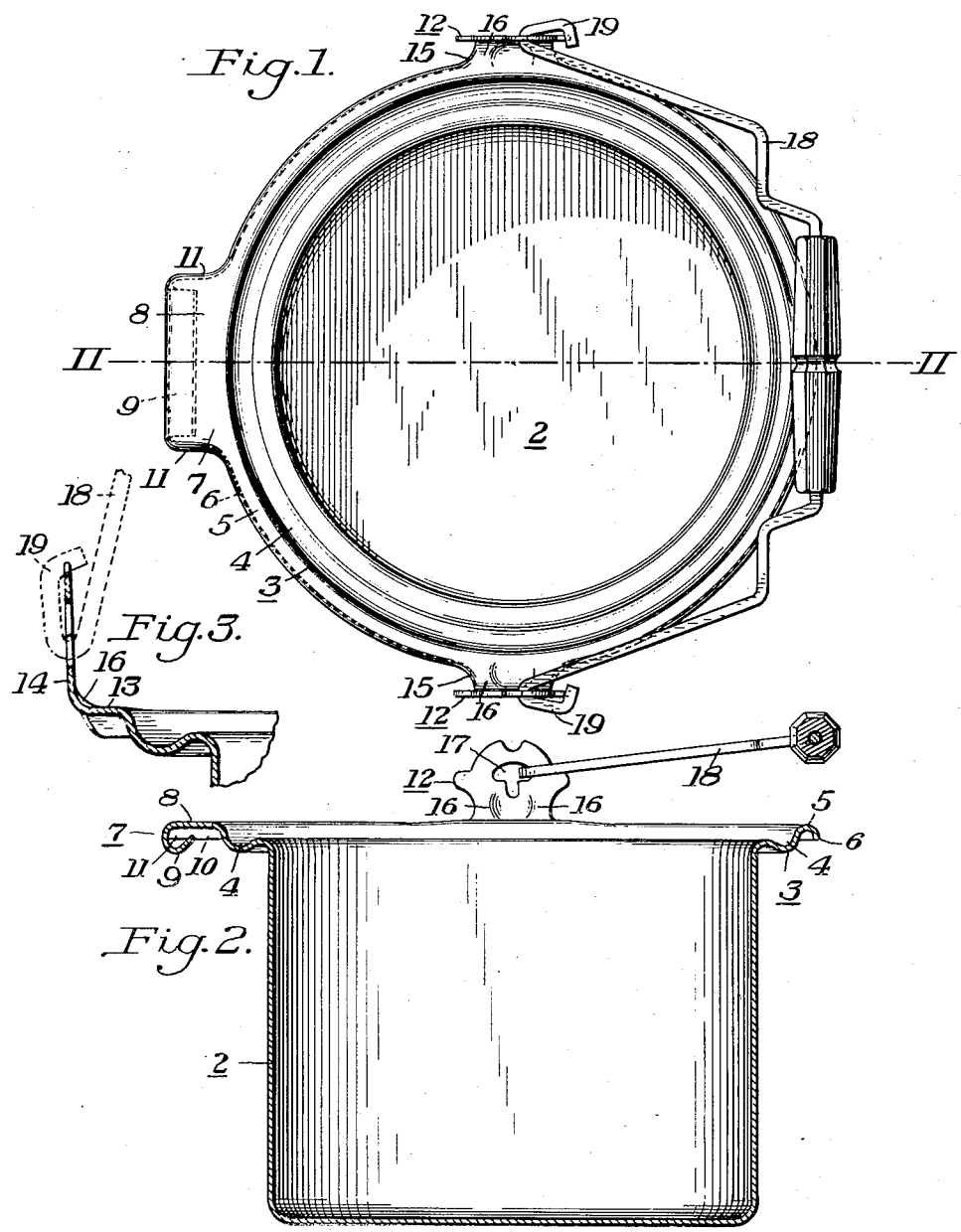
INVENTOR
William T. Christman
by his atty's
Byrnes, Stebbing, Parmelee & Blenko

UNITED STATES PATENT OFFICE 1,980,383

COOKING UTENSIL

William T. Christman, Mount Lebanon, Pa., assignor to Federal Enameling & Stamping Company, McKees Rocks, Pa., a corporation of Pennsylvania Application November 14, 1933, Serial No. 697,935

4 Claims. (Cl. 53—8)

This invention relates to cooking utensils and, more particularly, domestic utensils and smaller sizes of kettles and pans.

According to the present invention, provision is made for a handle at the top of a pan of unique, strong and convenient construction. Provision is also made for an improved arrangement of ears for securing a bail to a pan or kettle. Pans are sometimes provided with a rim at the upper edge thereof in which is a trough. The edge of the cover sits in this trough, and condensation which accumulates on the inside of the cover flows down into the trough and, in effect, forms a water seal for the edge of the cover. It is to pans thus constructed that the present invention is particularly applicable.

The invention may be readily understood by reference to the accompanying drawing, in which Figure 1 is a top plan view of one form of kettle or pan embodying my invention;

Figure 2 is a side elevation of the utensil shown in Figure 1; and

Figure 3 is a fragmentary view showing one of the bail ears and the adjacent portion of the pan or receptacle in section.

According to the invention, there is provided a kettle or like utensil having a main body portion 2 with the customary bottom and sides. Formed integral with the top portion of the utensil is an outwardly extending flange designated generally as 3. This flange has a trough portion 4 therein and outside of the trough portion 4 there is a rim portion 5, the outer edge of which is turned downwardly as indicated at 6. As stated above, the trough 4 is provided for the purpose of receiving the edge of the cover of a pan (the cover not being shown) and retains some of the water which condenses on the inside of the cover, to form a water seal around the edge of the cover.

In the present invention, there is provided a handle formed integral with the flange which is of unique construction, convenient to use, and strong. In the drawing, I have shown one such handle on the flange, but it is obvious that the handle may be duplicated at diametrically opposite points where this is desired. The handle is designated generally as 7, and comprises an extension 8 formed integral with the flange 3 and extending outwardly from the rim of the pan. The outer edge of this extension 8 is turned under, as shown in Figure 2, to form a bead 9. Between the bead 9 and the trough 4, there is formed by this arrangement, a recess 10 for receiving the tips of the fingers of the person handling the pan. The handle is positioned far enough out from the bottom of the pan so as to normally be reasonably cool. Its shape is such that it may be conveniently grasped, and the bead 9 enables the handle to be more firmly held. The side edges of the extension 8 are turned down as indicated at 11, to the same extent that the portion 6 on the rim 5 is turned down. These downturned side edges 11 reinforce the handle and make it strong and rigid, even though the pan is made of fairly light gauge metal.

It has heretofore been the general practice in providing bail ears for pans, to secure such ears either by riveting or spot welding to the side walls of the pan. With the present invention, ears are provided without riveting and welding, and which are stronger and afford a more convenient disposition of the handle or bail than ears as heretofore usually provided on receptacles of this nature. In the drawing, the ears, which are diametrically opposite and which are shown as being positioned 90° from the handle 7, are designated generally by the reference numeral 12. Each of these ears is formed integral with the flange 3, the ears having portions 13 which extend laterally out from the rim 5 of the utensil. Beyond this lateral or horizontally extending portion 13, the metal is bent up to a substantially vertical plane, the bent-up portions being designated 14. The side edges of the horizontal part 13 are turned down to the same extent as the portion 6 at the point where the portion 13 merges into the rim of the pan, i. e., the points 15 in Figure 1. These downwardly turned parts gradually flatten out the plane of the vertical portion 14. They thus provide a reinforcement for the horizontal portion of the ear, preventing this portion of the ears from bending. In addition to this, the ears may be further reinforced by having ridges bent therein as indicated at 16. The vertical portions 14 of the ears are provided with substantially T-shaped openings 17. The bail is designated 18. It is provided at its ends with a hook portion 19. These hook portions 19 pass through the opening 17 in the bail, the hooks being turned outwardly. The horizontal portions 13 on the ears serve to project the ears outwardly from the edge of the pan or utensil a sufficient distance to enable the cover to be conveniently applied to and removed from the pan without interference from the bail. This is clearly apparent from Figure 3 where the dotted lines indicate the hook formed on the end of the bail, and it will be seen that there is ample clearance between the bail and the trough where the cover would be applied.

The invention provides a unique construction in the arrangement of the handles and bails for utensils, particularly those utensils wherein there is provided a flange having a peripheral trough.

I claim:

1. A cooking utensil comprising an integral body having an outwardly extending peripheral flange at the top thereof, said flange having a trough portion therein and a rim portion outside the trough portion, and a handle comprising an integral extension projecting from the rim of the flange having its outer edge rolled under to form a bead, a finger recess being provided between said bead and the portion of the flange which forms the trough.

2. A cooking utensil comprising an integral body having an outwardly extending peripheral flange at the top thereof, said flange having a trough portion therein and a rim portion outside the trough portion, and a handle comprising an integral extension projecting from the rim of the flange having its outer edge rolled under to form a bead, a finger recess being provided between said bead and the portion of the flange which forms the trough, said rim portion having a downturned edge, said integral extension having the side edges thereof turned down and merging with the downturned edge of the rim for stiffening such extension.

3. A cooking utensil comprising an integral body having an outwardly extending peripheral flange at the top thereof, said flange having a trough therein and a rim portion outside the trough portion, said rim being turned downwardly at its outermost edge around the greater portion of the periphery of the vessel, it being provided, however, at diametrically opposite points with integral ears which extend laterally from the rim and then turn upwardly substantially vertically, and a bail attached to said ears.

4. A cooking utensil comprising an integral body having an outwardly extending peripheral flange at the top thereof, said flange having a trough therein and a rim portion outside the trough portion, said rim being turned downwardly at its outermost edge around the greater portion of the periphery of the vessel, it being provided, however, at diametrically opposite points with integral ears which extend laterally from the rim and then turn upwardly substantially vertically, and a bail attached to said ears, the edge portions of the ears where they project out from the rim being turned down to join with the downwardly turned edge of the rim, the downturned portion of the edge tapering outwardly into the vertical part of the ear thereby substantially reinforcing the laterally extending part of the ear against bending strains.

WILLIAM T. CHRISTMAN.